Patented Apr. 16, 1940

2,197,405

UNITED STATES PATENT OFFICE 2,197,405

METHOD OF TREATING ALUMINUM SURFACES

Junius D. Edwards, Oakmont, Pa., assignor to Aluminum Company of America, Pittsburgh, Pa., a corporation of Pennsylvania No Drawing. Application April 12, 1937, Serial No. 136,311

4 Claims. (Cl. 154—40)

This invention relates to the treatment of aluminum surfaces, and more particularly to the treatment of aluminum surfaces prior to joining other materials thereto by means of an adhesive material.

In joining aluminum and other materials as, for instance, in securing together sheets of paper and aluminum foil, it has not been possible to obtain complete and uniform adherence with aqueous adhesives. Aluminum surfaces, and by aluminum I mean to include aluminum and aluminum base alloys, as they come from the usual fabricating processes, such as rolling, are water repellent, so that an aqueous adhesive will not wet them. In other characteristics, such as cost, and ease of handling and storage, aqueous adhesives are to be preferred over other adhesives.

Accordingly, it is an object of my invention to treat the surface of aluminum in fabricated form so that it will be wet readily by aqueous materials. More particularly, it is an object of my invention so to treat aluminum in fabricated form prior to securing another material thereto that it will be readily wet by aqueous adhesives. Specifically, it is an object of my invention to provide a method of forming aluminum foil-paper composite sheet whereby complete and uniform adherence of the paper to the foil is obtained.

According to my invention, I treat the aluminum surface with phosphoric acid or a solution of phosphoric acid in water. The strength of the solution may vary within wide limits, the concentration being chosen according to the dictates of convenience. The aluminum surface may be treated with a grease solvent, such as alcohol or the like, prior to the treatment with the phosphoric acid, or the grease solvent may be admixed with the phosphoric acid. Admixture of the grease solvent with the phosphoric acid is preferred over treating separately with the two materials, but is not essential to obtaining adequate results.

Some applications require strong solutions or mixtures of phosphoric acid, and the treatment in phosphoric acid is followed by washing and drying, leaving a surface which is readily wet by aqueous materials. In other applications, such as in the continuous treatment of aluminum foil, a solution diluted to 2 per cent or less of phosphoric acid may be used and may be dried on the foil without washing, providing a surface which is readily wet by aqueous materials. The admixture of alcohol or the like, referred to above, is of particular advantage when such dilute solutions are used, since it facilitates the drying of the surface by heating.

In practice, as, for example, in securing together aluminum foil and paper, the aqueous adhesive may be distributed on the foil after the phosphoric acid treatment and the adhesive-covered foil applied to the paper by any suitable means. Similarly, the aqueous adhesive may be distributed on the paper before or during the treatment of the foil with phosphoric acid and the two materials brought together by suitable means.

Demonstrating the variation in proportions which is permissible in the mixture within the scope of my invention, two examples of proportions which have given excellent results are:

|  | Example 1 | Example 2 |
|---|---|---|
|  | Percent | Percent |
| Phosphoric acid (85%) | 45 | 28 |
| Denatured alcohol | 55 | 72 |
| Total | 100 | 100 |

These mixtures may be diluted with water, as desired, and according to whether strong or dilute solutions are required. Example 2, above, has given excellent results without dilution for the treatment of surfaces resulting from heavy fabricating operations, while the mixture of Example 1 has given good results on aluminum foil when diluted with an equal or slightly greater proportion of water. In one instance giving good results, the mixture of Example 1 was diluted to a water content of about 54 per cent, the material of Example 1 constituting 46 per cent and the phosphoric acid alone being about 18 per cent of the solution. Good results have been obtained also by diluting the mixture of Example 1 to a water content of 98 per cent, the phosphoric acid plus alcohol content being 2 per cent, and the phosphoric acid alone being less than 1 per cent of the solution. With this very dilute solution, the surface is not washed subsequent to the phosphoric acid treatment, the solution being permitted to dry on the surface, which then is wet readily by aqueous adhesives. In making up the mixture, it is essential to use the higher percentages of alcohol when the material is to be used without dilution or with a comparatively small amount of water, and the higher percentages of phosphoric acid when the mixture is to be diluted to a water content of 90 per cent or over.

While I have described my invention with reference to specific applications and specific examples, it is to be understood that I do not consider my invention as limited by these specific disclosures, but only as defined in the appended claims.

I claim:

1. A method of bonding fibrous material to an aluminum foil, comprising treating the aluminum foil surface with a mixture containing an organic grease solvent and phosphoric acid as essential ingredients, drying the surface, and subsequently applying an aqueous adhesive and the fibrous material to said surface.

2. A method of bonding fibrous material to an aluminum foil, comprising treating the aluminum foil surface with an aqueous solution of a mixture containing an organic grease solvent and phosphoric acid as essential ingredients, drying the surface, and subsequently applying an aqueous adhesive and the fibrous material to said surface.

3. A method of bonding fibrous material to an aluminum foil, comprising treating the aluminum foil surface with a mixture containing alcohol and phosphoric acid as essential ingredients, drying the surface, and subsequently applying an aqueous adhesive and the fibrous material to said surface.

4. A method of making aluminum foil-paper composite sheet, comprising treating the aluminum foil surface with a mixture containing an organic grease solvent and phosphoric acid as essential ingredients, drying the surface, and subsequently applying an aqueous adhesive and paper to said surface.

JUNIUS D. EDWARDS.